United States Patent Office 3,681,299
Patented Aug. 1, 1972

---

3,681,299
PROCESS FOR CROSSLINKING POLYMERS CONTAINING MERCAPTAN GROUPS
John H. Bateman, Haverstraw, N.Y., assignor to Ciba-Geigy Corporation
No Drawing. Filed May 1, 1970, Ser. No. 33,970
Int. Cl. C08g 23/00
U.S. Cl. 260—79    11 Claims

ABSTRACT OF THE DISCLOSURE

Mercaptan containing polymers are crosslinked at ambient temperatures with polyfunctional dipolar compounds such as polyfunctional nitrile N-oxides or with precursors to the dipolar compounds such as polyfunctional hydroxamoyl halides and acid acceptors. The crosslinked products are useful as adhesives, sealants and coatings.

---

This invention relates to the crosslinking of polymers containing mercaptan groups and to the crosslinked products so produced. More particularly, it relates to the process of crosslinking polymers containing a plurality of mercaptan groups with polyfunctional dipolar compounds such as polyfunctional nitrile N-oxides or with precursors to the dipolar compounds such as polyfunctional hydroxamoyl halides and acid acceptors, and to the resulting crosslinked products.

Crosslinking systems heretofore proposed for use in crosslinking mercaptan containing polymers all have certain undesirable features. Generally, prior art curing systems form by-products or residues which result in weaker and less resistant structures, and most crosslinking mechanisms result in the formation of disulfide linkages which are oxidatively unstable and possess poor thermal resistance.

In accordance with the present invention it has been found that polymers containing a plurality of mercaptan groups are crosslinked with polyfunctional dipolar compounds such as polyfunctional nitrile N-oxides or with precursors to the dipolar compounds such as poly(hydroxamoyl halides) and acid acceptors to produce tough, solvent-resistant, thermally and oxidatively stable crosslinked products.

The products of this invention are useful as adhesives, sealants and coating compounds.

Illustrative examples of the classes of the polyfunctional dipolar compounds and their precursors which can be used in accordance with this invention are given as follows:

(a) Nitrile oxides such as terephthalo-bis(nitrile N-oxide), a precursor of which is terephthal-bis(hydroxamoyl chloride).
(b) Nitrile imines such as isophthalo-bis(N-phenylnitrile-imine), a precursor of which is isophthaloyl-bis(phenylhydrazide chloride).
(c) Nitrile ylides such as isophthalo-bis(phenyl nitrile ylide), a precursor of which is isophthaloyl-bis[(N-benzyl)benzimidoyl chloride].
(d) Diazoalkanes such as ethylene-bis(diazoacetate), a precursor of which is ethylene-bis[(N-nitroso)benzamide acetate].
(e) Azides such as methylene-bis(p-phenylazidie).
(f) Azomethine oxides (nitrones) such as terephthalaldehyde-bis(N-phenylnitrone), a precursor of which is terephthalaldehyde-bis(N-phenylnitrone hydrochloride).
(g) Azomethine imines such as bis(3,4-dihydroisoquinoline-N-(p-anilylide)sulfone, a precursor of which is bis[3,4-dihydroisoquinolium-N-(p-phenylamino)] sulfone dibromide.
(h) Azomethine ylides such as bis(3,4-dihydroisoquinoline-N-(p-benzylide)sulfone, a precursor of which is bis[3,4-dihydroisoquinolium-N-(p-benzyl)]sulfone dibromide.

The polyfunctional nitrile N-oxides which can be used as curing agents in accordance with this invention have the following general formulae:

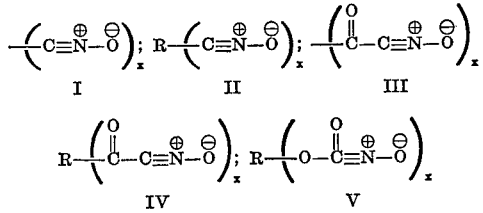

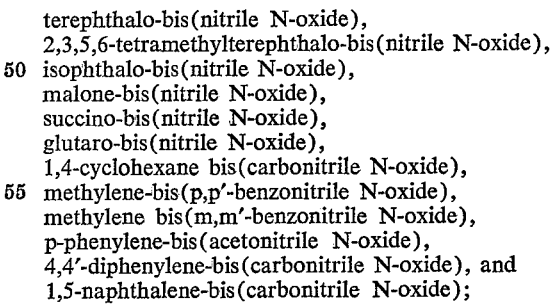

where R is an organic radical inert to the crosslinking reaction and $x$ is an integer greater than 1. Thus, R can be alkylene, cycloalkylene, arylene, aralkylene, alkarylene, alkylene-diarylene, cycloalkylene-dialkylene, arylene-dialkylene, etc., radicals such as methylene, ethylene, trimethylene, tetramethylene, pentamethylene, hexamethylene, octamethylene, decamethylene, dodecamethylene, octadecamethylene, cyclohexylene, cyclopentylene, o-, m-, and p-phenylene, naphthylene, biphenylene, anthrylene, xylylene, phenylethylene, phenylenedimethylene, phenylenediethylene, methylenediphenylene, ethylenediphenylene, cyclohexylenedimethylene, cyclopentylenedimethylene, etc., or an alkylene-oxyalkylene, arylene-oxyarylene, alkarylene-oxyarylene, alkarylene-oxyalkarylene, aralkylene-oxyalkylene, aralkylene-oxyaralkylene, methylene - oxymethylene, ethylene-oxyethylene, phenyleneoxyphenylene, methylenephenylene-oxyphenylenemethylene, phenylenemethylene - oxymethylenephenylene, or the corresponding thio radicals such as ethylene-thioethylene, phenylene-thiophenylene, phenylenemethylene-thiomethylene-phenylene, etc., and sulfones, such as ethylene - sulfonylethylene, m-bis(methylenesulfonyl) phenylene, etc. The maximum value for $x$ will, of course, be dependent on the number of carbon atoms in R, since the value of $x$ cannot exceed the valence of R. Preferably, $x$ will be an integer of from 2 to 10.

Exemplary of the new polyfunctional nitrile N-oxides which are useful in this invention are the bis(nitrile N-oxides) having Formula II above, as, for example, terephthalo-bis(nitrile N-oxide),
2,3,5,6-tetramethylterephthalo-bis(nitrile N-oxide),
isophthalo-bis(nitrile N-oxide),
malone-bis(nitrile N-oxide),
succino-bis(nitrile N-oxide),
glutaro-bis(nitrile N-oxide),
1,4-cyclohexane bis(carbonitrile N-oxide),
methylene-bis(p,p'-benzonitrile N-oxide),
methylene bis(m,m'-benzonitrile N-oxide),
p-phenylene-bis(acetonitrile N-oxide),
4,4'-diphenylene-bis(carbonitrile N-oxide), and
1,5-naphthalene-bis(carbonitrile N-oxide);

and polyfunctional nitrile oxides which have more than two nitrile oxide groups, such as 1,3,5-benzene-tris(carbonitrile N-oxide), 1,5,7-naphthalene-tris(carbonitrile N-oxide), penta(acrylonitrile N-oxide) deca(crotononitrile N-oxide), as well as polyfunctional nitrile oxides such as 2,2'-oxybisethyl carbonitrile N-oxide), i.e., 2,2'-bis (carbonitrile N-oxide) diethyl ether, 4,4'-oxybis(phenylcarbonitrile N-oxide), i.e., 4,4'-bis(carbonitrile N-oxide) diphenyl ether, 2,2'-thiabis(ethyl ctrbonitrile N-oxide), 4,4'-thiabis(phenyl carbonitrile N-oxide), etc. Mixtures of two or more polyfunctional nitrile N-oxides can also be used, if desired.

Cyanogen N,N'-dioxide is a di(nitrile oxide) which has the formula $$\overset{\ominus}{O}-\overset{\oplus}{N}\equiv C-C\equiv \overset{\oplus}{N}-\overset{\ominus}{O}$$

i.e., Formula I above. While this compound can be used in crosslinking mercaptan containing polymers in accordance with this invention, it is a highly unstable compound which is preferably generated in situ from its precursors as described in more detail below.

Another group of polyfunctional nitrile N-oxides that are useful in this invention are the polyfunctional carbonyl nitrile N-oxides having Formulas III and IV above, as for example, oxalyl bis(carbonitrile N-oxide),
malonyl bis(carbonitrile N-oxide),
succinyl bis(carbonitrile N-oxide),
adipyl bis(carbonitrile N-oxide),
sebacyl bis(carbonitrile N-oxide),
1,2,3-propane-tris(carbonyl carbonitrile N-oxide),
1,2,4-pentane-tris(carbonyl carbonitrile N-oxide),
1,4-cyclohexane-bis(carbonyl carbonitrile N-oxide,
p-phenylene-bis(acetyl carbonitrile N-oxides),
2,2'-thiabis(acetyl carbonitrile N-oxide),
3,3'-thiabis(propionyl carbonitrile N-oxide),
isophthalyl carbonitrile N-oxide,
terephthalyl carbonitrile N-oxide,
4,4'-bis(benzoyl carbonitrile N-oxide),
4,4'-methylene-bis(benzoyl carbonitrile N-oxide),
4,4'-oxybis(benzoyl carbonitrile N-oxide),
3,3'-thiabis(benzoyl carbonitrile N-oxide), polymers containing pendant carbonitrile N-oxide groups, as for example, ethylene-acrylic acid copolymers and partially hydrolyzed poly(alkyl acrylate) where two or more of the pendant carboxyl groups have been converted to carbonyl carbonitrile N-oxide groups, etc.

Still another group of polyfunctional nitrile N-oxides that can be used as crosslinking agents in accordance with this invention are the polyfunctional carbonyl nitrile oxides having Formula V above, as for example, the ethylene glycol, tetramethylene glycol, hexamethylene glycol, 1,4-cyclohexene glycol, resorcinol, 4,4'-dihydroxybiphenylene, isopropylidene-4,4' bisphenol, etc. esters of carboxy carbonitrile N-oxides, etc.

The polyfunctional nitrile oxides are all readily prepared by treatment of the correspondng polyfunctonal hydroxamoyl halides, also known as polyfunctional hydroxamic halides, in the presence of an alkaline material. Examples of said alkaline materials, also known as acid acceptors, are tertiary amines, alkali and alkaline earth metal hydroxides, alkoxides and similar basic materials. This reaction can be illustrated as follows:

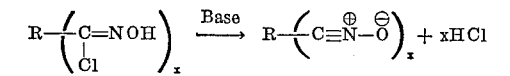

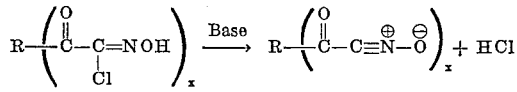

The polyfunctional nitrile N-oxides of Formula II can also be prepared by the reaction of isocyanates and tertiary amines with nitroalkanes.

The hydroxamoyl halide precursors of the polyfunctional nitrile oxides having Formula II are readily obtained by reaction of an aldehyde oxime with a halogenating agent such as nitrosyl chloride, nitrosyl bromide, chlorine, bromine, etc. The hydroxamoyl halide precursors of the polyfunctional nitrile oxides having Formulas III and IV can be prepared from poly(haloacetyl) compounds, such as bis(chloroacetyl), methylene-bis(chloroacetyl), ethylene-bis(chloroacetyl), o-, m-, and p-bis(chloroacetyl) benzene, 4,4'-bis(chloroacetyl) biphenyl, bis(4 - chloroacetylphenyl)ether, by reaction of the poly(haloacetyl) compound with a nitrosating agent such as an alkyl nitrite, $N_2O_3$, nitrosyl chloride, etc., and a hydrogen halide under anhydrous conditions.

The hydroxamoyl halide precursors of the polyfunctional carbonyl nitrile oxides having Formula V are prepared by reaction of an amino ester with sodium nitrite and hydrogen halide to form a diazo ester followed by conversion of the diazo ester with nitrous acid and hydrogen halide to the hydroxamoyl halide. Thus, for example, with glycine or one of its precursors, such as aminoacetonitrile, glycinate esters of diols, triols, etc., can be prepared, which can then be converted to polyfunctional carbonyl hydroxamoyl halides.

The crosslinking is carried out by contacting a mercaptan containing polymer with about 0.01% to about 50% by weight of the polymer of a polyfunctional dipolar compound such as a polyfunctional nitrile N-oxide at a temperature from about 0° C. to about 150° C.

Generally about 0.1% to about 10% by weight of the polymer of the polyfunctional dipolar compound at a temperature from 20° C. to about 100° C. is preferred.

The mercaptan containing polymers are also crosslinked by contacting said polymers with precursors to the polyfunctional dipolar compounds and an acid acceptor.

For example, the mercaptan containing polymers are crosslinked by contacting said polymers with a polyfunctional hydroxamoyl halide and an acid acceptor in the temperature range from about 0° C. to about 150° C., preferably from about 20° C. to about 100° C. The polyfunctional hydroxamoyl halides are equivalent to the precursors to the polyfunctional nitrile N-oxides described previously. The acid acceptors are equivalent to the alkaline materials described above, that is tertiary amines, alkali and alkaline earth metal hydroxides and the like.

The amount of a precursor such as the nitrile N-oxide or a polyfunctional hydroxamoyl halide employed (based on the weight of the polymer) will be from about 0.05% to about 50%, preferably from about 5% to about 20%.

The acid acceptor or alkaline material should be present in at least a stoichiometric amount based on the precursor and preferably in an excess of from about 10% to about 50% over the stoichiometric amount required.

In this latter instance, the polyfunctional hydroxamoyl halide, preferably the polyfunctional hydroxamoyl chloride, may be going through the polyfunctional nitrile N-oxide. However, without limiting this invention to the specific method of crosslinking, the crosslinking mechanism can also be going through a new route.

Any polymer containing a plurality of mercaptan groups can be crosslinked according to this invention. By a plurality of mercaptan groups is meant any polymeric material with two or more mercaptan groups on the polymer chain.

The elastomers of this invention optionally can also contain a number of additives which will provide the final product with particular properties desired. Thus, the composition can contain fillers such as carbon black, silicone dioxide and the like, stabilizers such as UV-stabilizers, antioxidants, pigments such as titanium dioxide, plasticizers or flexibilizers, hydrogenated terphenyl (HB 40 Monsanto) and the like and other suitable additives which would yield a composition particularly useful for a specific application.

The following non-limiting examples are presented to more clearly illustrate the nature of this invention.

EXAMPLE I 100 g. of a liquid polymercaptan resin of molecular weight 3900 containing 0.85% SH (prepared by treating a trifunctional polypropylene oxide with three equivalents of toluene diisocyanate followed by one equivalent of mercaptobutanol) is mixed with 6.0 g. of terephthalbis(nitrile N-oxide). The mixture is cured to tack free, tough elastomer which is insoluble in benzene.

EXAMPLE II 2.18 g. of the liquid polymercaptan resin used in Example I was mixed with 0.20 g. of terephthal-bis(hydroxamoyl chloride). To this mixture was added 0.22 g. of triethylamine with thorough mixing. The mixture was cured to a tack free elastomer in several minutes.

EXAMPLE III 100 g. of a liquid mercaptan containing polysulfide polymer (LP-32 supplied by Thiokol Chemical Corporation), 6.75 g. of terephthal-bis(hydroxamoyl chloride) and 50 g. of silica A10 were intimately mixed together. To this mixture was added 14 g. of Ca(OH)$_2$ with thorough mixing. The resulting, tough elastomer was tack free in approximately 2 hours, and was insoluble in benzene.

EXAMPLE IV

A liquid, mercaptan-terminated resin is prepared from bis(chloroethyl formal), 1,2,3-trichloropropane and sodium polysulfide using the process described in Houben-Weyl, vol. 1412, p. 595, (Georgy Thieme Verlag, Stuttgart) (1963), and in U.S. 2,466,963.

The resin has a molecular weight of 5,000 and contains 1.45 percent SH. 250 g. of this resin is mixed with 200 g. of silica A10, and then with 22.2 g. of 2,4,6-trimethyl isophthalo dinitrile oxide. The mixture is cured to a tack free, soft elastomer.

EXAMPLE V 100 g. of a liquid polymercaptan resin (DPM-1002 a liquid di and trifunctional mercaptan terminated polyether supplied by Diamond Alkali Company) is mixed with 10 g. of 4,4'-oxybis(phenylglyoxylohydroxamoyl chloride). To this mixture is added 7.0 g. of triethylamine with thorough mixing. The mixture is cured to a tack free, tough elastomer which is insoluble in benzene.

EXAMPLE VI 1.43 g. of the polymer of Example I was mixed with 0.2 g. of isophthaloyl-bis(phenylhydrazide chloride). To this mixture was added 0.22 g. of triethylamine with thorough mixing. The mixture was cured to a tack free, tough elastomer.

What is claimed is:

1. A process of crosslinking a mercaptan containing polymer which comprises contacting said polymer with from about 0.01 percent to about 50 percent by weight of the polymer of a polyfunctional nitrile N-oxide having the formula selected from the group consisting of

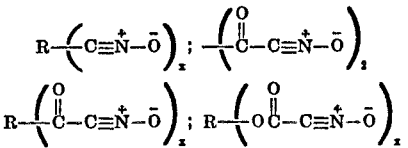

where

R is an organic radical inert to the crosslinking reaction, and x is an integer from 2 to 10, said process being carried out at a temperature of from 0° C. to about 150° C.

2. A process according to claim 1 wherein said polyfunctional nitrile N-oxide has the formula

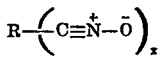

wherein R is an organic radical inert to the crosslinking reaction and x is an integer from 2 to 10.

3. The process according to claim 1 wherein the polyfunctional nitrile N-oxide is terephthalo-bis(nitrile N-oxide).

4. A process of crosslinking a mercaptan containing polymer which comprises contacting said polymer with (a) from about 0.05 percent to about 50 percent by weight of the polymer of a polyfunctional hydroxamoyl halide precursor to a nitrile N-oxide wherein said polyfunctional hydroxamoyl halide precursor has the formula selected from the group consisting of

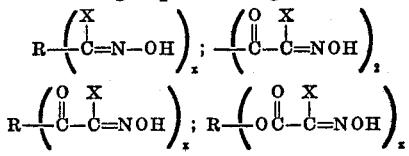

wherein

R is an organic radical inert to the crosslinking reaction, x is an integer from 2 to 10, and X is a halogen, (b) an alkaline material in at least a stoichiometric amount based on the weight of the polyfunctional hydroxamoyl halide precursor (c) said process being carried out at a temperature from about 0° C. to 150° C.

5. A process according to claim 4 wherein said precursor is a polyfunctional hydroxamoyl halide having the formula

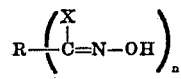

wherein (a) R is an organic radical inert to the crosslinking reaction;

(b) n is an integer from 2 to 10; and (c) X is a halogen.

6. A process according to claim 4 wherein said alkaline material is triethylamine.

7. A process according to claim 5 wherein said polyfunctional hydroxamoyl halide is terephthalo-bis(hydroxamoyl chloride).

8. A polymer containing a plurality of mercaptan groups crosslinked with a polyfunctional nitrile N-oxide having the formula selected from the group consisting of

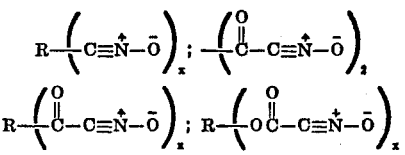

where

R is an organic radical inert to the crosslinking reaction, and x is an integer from 2 to 10.

9. The crosslinked polymer of claim 8 which is a trifunctional mercaptan terminated polypropylene oxide crosslinked with terephthal-bis(nitrile N-oxide).

10. The crosslinked polymer of claim 8 which is a polysulfide crosslinked with terephthal-bis(nitrile N-oxide).

11. The crosslinked polymer of claim 8 which is a mercaptan terminated polyether crosslinked with terephthal-bis(nitrile N-oxide).

References Cited

UNITED STATES PATENTS 3,247,138   4/1966   Jorczak et al. _____ 260—18
3,349,057   10/1967  Giordano _____ 260—45.75

OTHER REFERENCES

Colodny et al., "Chemorheological Study of Cured Polysulfide Liquid Polymers," Journal of Applied Polymer Science, vol. II, No. 4, pp. 39 to 45 (1959).

DONALD E. CZAJA, Primary Examiner

M. I. MARQUIS, Assistant Examiner

U.S. Cl. X.R.

260—2.5 AM, 33.6 R, 37 R, 37 N, 75 NP, 77.5 AM, 77.5 SAC, 77.5 TB, 79.1

UNITED STATES PATENT AND TRADEMARK OFFICE
CERTIFICATE OF CORRECTION

PATENT NO. : 3,681,299

DATED : August 1, 1972

INVENTOR(S) : John H. Bateman

It is certified that error appears in the above-identified patent and that said Letters Patent are hereby corrected as shown below:

Column 2, line 69, "ctrbonitrile" should read -- carbonitrile --.

Column 3, line 60, "  "+HCl" should read -- + x HCl --.

Signed and Sealed this thirtieth Day of August 1977

[SEAL]

Attest:

RUTH C. MASON
Attesting Officer

C. MARSHALL DANN
Commissioner of Patents and Trademarks